(12) United States Patent
Kimpe et al.

(10) Patent No.: US 7,672,367 B1
(45) Date of Patent: Mar. 2, 2010

(54) SYSTEM AND METHOD FOR SELECTING DATA RATES OF INITIALIZATION SIGNALS

(75) Inventors: Marc Kimpe, Huntsville, AL (US); Jack G. Atkinson, Jr., Huntsville, AL (US); Richard L. Goodson, Huntsville, AL (US); Arlynn Wilson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 1003 days.

(21) Appl. No.: 11/202,439

(22) Filed: Aug. 12, 2005

(51) Int. Cl.
*H04B 17/00* (2006.01)
*H04L 23/00* (2006.01)
*H04B 1/38* (2006.01)

(52) U.S. Cl. .................. 375/225; 375/377; 375/219

(58) Field of Classification Search ............. 375/222, 375/219, 377, 224, 225, 227; 379/93.01; 370/241, 252, 253
See application file for complete search history.

(56) References Cited

U.S. PATENT DOCUMENTS

| | | | | |
|---|---|---|---|---|
| 5,048,054 A | * | 9/1991 | Eyuboglu et al. | 375/222 |
| 5,214,637 A | * | 5/1993 | Sridhar et al. | 370/286 |
| 5,297,186 A | * | 3/1994 | Dong | 375/222 |
| 5,790,594 A | * | 8/1998 | Peng | 375/222 |
| 5,850,421 A | * | 12/1998 | Misra et al. | 375/354 |
| 5,946,104 A | * | 8/1999 | Yoshida | 358/412 |
| 6,246,716 B1 | | 6/2001 | Schneider | |
| 6,831,897 B2 | * | 12/2004 | Takagi et al. | 370/252 |
| 2002/0136397 A1 | | 9/2002 | Zeng et al. | |
| 2003/0101206 A1 | * | 5/2003 | Graziano et al. | 708/277 |

FOREIGN PATENT DOCUMENTS

| WO | WO 02/087186 | * | 10/2002 |
|---|---|---|---|
| WO | WO 03/043262 A1 | | 5/2003 |

OTHER PUBLICATIONS

International Telecommunication Union, "Series G: Transmission Systems and Media, Digital Systems and Networks," ITU-T Recommendation G.991.2, Dec. 2003, pp. 20, 96, 124, and 125.
Marc Kimpe, U.S. Appl. No. 11/202,476 entitled, "System and Method for Selecting Data Rates of Data Signals," filed Aug. 12, 2005.

* cited by examiner

*Primary Examiner*—Tesfaldet Bocure
(74) *Attorney, Agent, or Firm*—Lanier Ford Shaver & Payne, PC; Jon E. Holland

(57) ABSTRACT

A system includes a transceiver for communicating over a telecommunication line that is coupled to the transceiver. The transceiver comprises logic configured to measure attenuation of at least one signal transmitted across the telecommunication line. The logic is further configured to automatically select, based on the measured attenuation, a plurality of different data rates for a plurality of initialization signals communicated via the transceiver during an initialization phase that precedes a data phase.

31 Claims, 4 Drawing Sheets

US 7,672,367 B1

SYSTEM AND METHOD FOR SELECTING DATA RATES OF INITIALIZATION SIGNALS

RELATED ART

Segments of telecommunication lines are usually bundled in cables that extend over large distances from transceivers at a central office to transceivers at remote locations, sometimes referred to as "customer premises." Signals communicated across telecommunication line segments bundled within the same cable couple from line-to-line causing crosstalk. The crosstalk between signals using the same frequencies may degrade signal performance and may limit the cable's capacity or data rates.

A wide variety of telecommunication technologies may be used to communicate across telecommunication line segments bound by the same cable. In order to allow signals from different technologies to co-exist in the same cable, spectrum management standards (e.g., T1.417-2003 *Spectrum Management for Loop Transmission*, referred to hereafter as "T1.417") have been developed. Such standards specify crosstalk limits to ensure that crosstalk will not reduce signal quality below a specified level. A telecommunication service provider is responsible for ensuring that signals communicated by its equipment satisfy the limits imposed by applicable spectrum management standards.

Signals that violate applicable spectrum management standards by causing an unacceptable amount of crosstalk to affect other signals communicated through the same cable are referred to as "spectrally incompatible." Signals that adhere to applicable spectrum management standards and, therefore, do not induce an unacceptable amount of crosstalk are referred to as "spectrally compatible."

The limits imposed by spectrum management standards are usually expressed in terms of acceptable power spectral density (PSD) masks as a function of cable attenuation. For some systems, such as single pair high-bit-rate digital subscriber line (SHDSL) systems, this is essentially equivalent to specifying maximum acceptable data rates as a function of line characteristics, such as wire gauge and reach. Generally, the maximum acceptable SHDSL data rate for a telecommunication line of a given wire gauge decreases as the length of the telecommunication line increases. If the signals communicated across a telecommunication line of a given length and wire gauge exceed the maximum PSD mask specified by the applicable spectrum management standard, such signals are spectrally incompatible.

If the line characteristics, such as reach and wire gauge, are known when a transceiver is installed, then a transceiver's data rate can be selected such that it does not exceed the maximum data rate specified by the applicable spectrum management standard. However, in many cases, several characteristics of a telecommunication line are unknown when a transceiver for communicating across the line is installed. Ensuring spectral compatibility in such cases can be problematic.

Moreover, due primarily to difficulties in determining accurate line lengths and therefore acceptable data rates, many transceivers, such as SHDSL transceivers, are not configured to automatically ensure spectral compatibility. In this regard, SHDSL transceivers have an optional capability to communicate probe signals of varying data rates during an initialization phase, sometimes referred to as "line probing," that precedes a training and subsequent data phase mode of communication. The signal-to-noise ratios of the probe signals are determined by the receiving transceiver, and the maximum data rate having a signal-to-noise ratio (SNR) above a specified threshold is selected for use in the data phase. If the selected data rate exceeds the rate specified by the applicable spectrum management standard, then the signals communicated during the data phase will not be spectrally compatible.

Moreover, better techniques for selecting more optimum data rates during initialization are generally desirable.

SUMMARY OF THE DISCLOSURE

Generally, embodiments of the present disclosure provide a system and method for selecting data rates of initialization signals.

A system in accordance with an exemplary embodiment of the present disclosure includes a transceiver for communicating over a telecommunication line that is coupled to the transceiver. The transceiver comprises logic configured to measure attenuation of at least one signal transmitted across the telecommunication line. The logic is further configured to automatically select, based on the measured attenuation, a plurality of different data rates for a plurality of initialization signals communicated via the transceiver during an initialization phase that precedes a data phase.

A method in accordance with an exemplary embodiment of the present disclosure comprises the steps of: estimating an attenuation of a first signal communicated during an initialization phase between a first transceiver and a second transceiver, the initialization phase preceding a data phase between the first and second transceivers; automatically selecting, based on the estimated attenuation, a data rate for a second signal communicated during the initialization phase; transmitting the second signal from the first transceiver to the second transceiver during the initialization phase; and selecting a data rate for use in the data phase based on the second signal.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for selecting data rates for initialization signals, such as probe signals, that are communicated between a plurality of transceivers during an initialization phase, which precedes a data phase mode of communication. In one exemplary embodiment, an initialization signal is transmitted from a first transceiver to a second transceiver, and the attenuation of the signal is measured after it has been received by the second transceiver. The measured attenuation is indicative of the distance between the first and second transceivers, and at least one data rate for at least one other initialization signal is automatically selected based on the measured attenuation. As an example, the data rates of various initialization signals, such as probe signals, may be selected such that the testing of such signals results in the selection of a more optimal data phase data rate and/or such that the initialization signals introduce less crosstalk interference to other signals communicated in the same binder.

Figure 1:
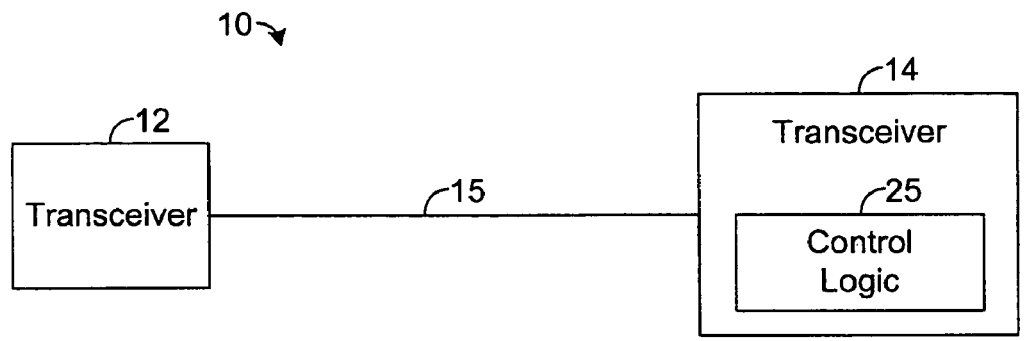
FIG. 1 is a block diagram illustrating an exemplary embodiment of a communication system in accordance with the present disclosure.

FIG. 1 depicts a communication system 10 in accordance with an exemplary embodiment of the present disclosure. As shown by FIG. 1, the system 10 comprises transceivers 12 and 14 remotely located from one another. The transceivers 12 and 14 are coupled to one another via a telecommunication line 15, such as a pair of conductive connections, sometimes referred to as a "twisted pair." One of the transceivers 12 or 14 may be located at a central office of a telecommunication network, and the other transceiver 12 or 14 may be located at a customer premises. In other embodiments, the transceivers 12 and 14 may reside at other locations.

The transceivers 12 and 14 are preferably configured to communicate with one another pursuant to established protocols. As an example, each of the transceivers 12 and 14 may be configured to communicate in accordance with single pair high-bit-rate digital subscriber line (SHDSL). In SHDSL, trellis coded pulse amplitude modulation (TC-PAM) is used to encode a data signal with data and to transmit the data signal to a remote transceiver, which demodulates the data signal to recover the encoded data. In other embodiments, other types of known or future-developed communication protocols may be employed by the transceivers 12 and 14.

Figure 2:
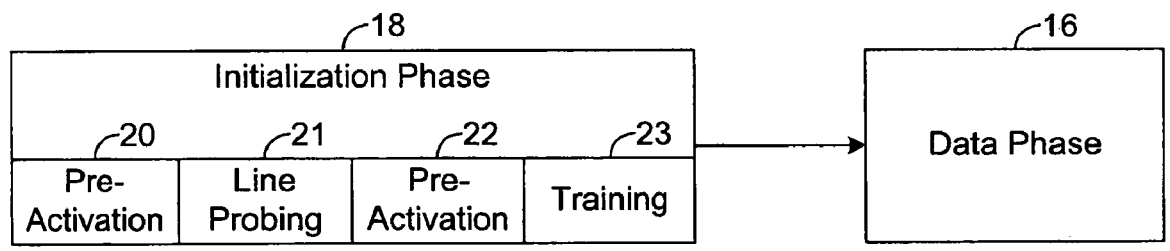
FIG. 2 is a flow chart illustrating an exemplary initialization phase and data phase in accordance with the present disclosure

As shown by FIG. 2, before entering into a data phase 16, the transceivers 12 and 14 first enter into an initialization phase 18. The initialization phase 18 can include multiple parts. For example, in accordance with existing protocol standards, the initialization phase 18 can comprise a first pre-activation phase 20, a line probing phase 21, a second pre-activation phase 22, and a training phase 22. In many standards, including SHDSL, the line probing phase 21 and second pre-activation phase 22 are optional.

In the first pre-activation phase 20, handshake signals are exchanged to inform each transceiver about the capabilities, such as supported data rates, of the other transceiver. During the line probing phase 21, probe signals are transmitted at data rates supported by both transceivers. The probe signals are tested to determine which of the probe signal data rates is suitable for use in the subsequent training and data phases 23 and 16. Techniques for selecting, during the line probing phase 21, a suitable data rate for the training and data phases 23 and 16 will be described in more detail hereafter. If the probing phase 21 is not implemented, then the highest data rate supported by both transceivers, as indicated by the handshake signals of the pre-activation phase 20, can be selected for use in the training and data phases 23 and 16.

If the optional line probe phase 21 is implemented, the second pre-activation phase 22 is also implemented in order to convey information indicative of the data rate selected during the line probing phase 21. Once this is accomplished, the training phase 23 begins. During the training phase 23, the transceivers 12 and 14 communicate at the pre-selected data rate (i.e., the data rate selected during the pre-activation phase 20 or the line probing phase 21) in order to train components of the transceivers 12 and 14 for communication in the data phase 16 at the pre-selected rate:

As shown by FIG. 1, the transceiver 14 comprises control logic 25 that generally controls the operation of the transceiver 14 and, in particular, selects a data rate for communication between the transceivers 12 and 14. The control logic 25 can be implemented in software, hardware, or a combination thereof. In an exemplary embodiment illustrated in FIG. 3, the control logic 25, along with its associated methodology, is implemented in software and stored in memory 33 of the transceiver 14.

Figure 3:
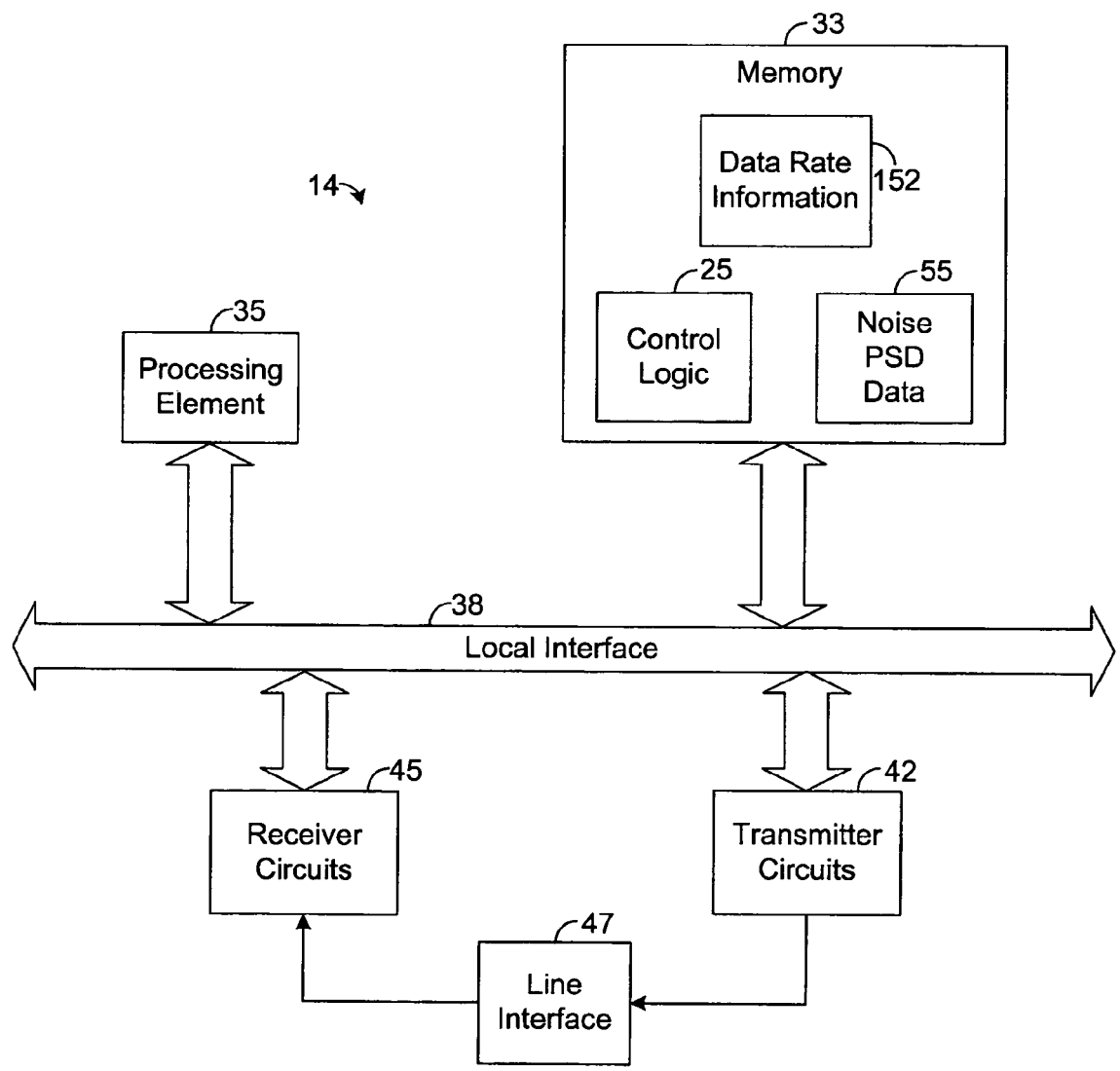
FIG. 3 is a block diagram, illustrating an exemplary embodiment of a transceiver depicted in FIG. 1.

The exemplary embodiment of the transceiver 14 depicted by FIG. 3 comprises at least one conventional processing element 35, such as a digital signal processor (DSP) or a central processing unit (CPU), that communicates to and drives the other elements within the transceiver 14 via a local interface 38 comprised of at least one conductive connection. The transceiver 14 of FIG. 3 also comprises transmitter circuits 42 and receiver circuits 45 that are coupled to a line interface 47, which is coupled to the telecommunication line 15 (FIG. 1). The line interface 47 may comprise a pair of terminals for conductively connecting to the telecommunication line 15. The line interface 47 may also comprise other components, such as a transformer, for example, commonly used to interface conventional transmitter and receiver circuits with a telecommunication line.

The transmitter circuits 42, operating generally under the control of the control logic 25, transmit signals over telecommunication line 15, and the receiver circuits 45, operating generally under the control of the control logic 25, receive signals from the telecommunication line 15. The configuration of the receiver circuits 45 and the transmitter circuits 42 can be identical or similar to receiver and transmitter circuits of conventional transceivers and, for brevity purposes, will not be described in detail herein. The components of the transceiver 14 may reside on one or more printed circuit boards, as is commonly done for the components of many conventional transceivers.

During the line probing phase 21, the transceiver 12 (FIG. 1) is configured to transmit probe signals at different data rates to the transceiver 14, which then selects one of such data rates for use in the subsequent training and data phases 23 and 16. In one embodiment, the control logic 25, for each of the probe signals transmitted during training, is configured to determine whether the probe signal's data rate is suitable for use during the data phase 16 and, therefore, the training phase 23, which preferably communicates training signals at the data rate selected for the data phase 16. Generally, a probe signal's data rate is suitable for use in the data phase 16 if the probe signal satisfies a predefined criteria for signal quality and if data signals communicated in the data phase 16 at the probe signal's data rate are spectrally compatible, as defined by an applicable standard, such as T1.417 in North America. Signal-to-noise ratio (SNR) is a widely used parameter of signal quality and may be used by the control logic 25 to identify suitable data rates.

In this regard, the control logic 25 may be configured to determine the SNR of each probe signal transmitted during line probing. Techniques for determining the SNR of a signal are generally well-known. In general, to determine the SNR of a received signal, the signal's power spectral density (PSD) is measured, and a noise PSD is indicative of the signal's noise is also measured. The measurement of the signal's PSD integrated across all frequencies to derive the power. The signal power is then divided by the noise power to generate the signal's SNR.

An SNR threshold is specified by an applicable standard, and the measured SNR of each probe signal is compared to the threshold. If the SNR of a probe signal exceeds the threshold, then the probe signal is determined to satisfy the predefined criteria for signal quality. In such a case, the probe signal's data rate is suitable for use in the training phase 23 and the data phase 16 provided that such data rate is spectrally friendly. A data rate of a probe signal communicated between two transceivers is referred to herein as being "spectrally friendly" if data signals communicated at such a data rate between the two transceivers are "spectrally compatible," as defined by the applicable standards. Conversely, a data rate of a probe signal communicated between two transceivers is referred to herein as being "spectrally unfriendly" if data signals communicated at such a data rate between the two transceivers are "spectrally incompatible," as defined by the applicable standards. Exemplary techniques for determining whether the probe signal data rate is spectrally friendly will be described hereinbelow.

Moreover, the control logic 25 is configured to select the highest suitable probe signal data rate as the data rate to be used in the subsequent training and data phases 23 and 16. Thus, once the transceivers 12 and 14 enter into the data phase 16, signals are communicated between the transceivers 12 and 14 at the data rate selected during the line probing phase 21 (i.e., the highest spectrally friendly data rate of any probe signal that satisfies the predefined signal quality criteria).

Various techniques may be employed by the control logic 25 to determine whether a probe signal data rate is spectrally friendly. In one exemplary embodiment, the control logic 25 determines whether a probe signal's data rate is spectrally friendly based on noise PSD data 55 (FIG. 3) that is predefined and stored within the memory 33 of the transceiver 12. The noise PSD data 55 defines various noise PSDs respectively associated with different data rates. Each predefined noise PSD associated with a particular data rate is tailored to ensure that any received signal having the particular data rate is spectrally compatible, in the case of a received data signal, or spectrally unfriendly, in the case of a received initialization signal, if the signal satisfies the predefined criteria for signal quality based on the associated PSD.

Moreover, when SNR is used to determine signal quality, a probe signal's measured PSD is divided by the associated noise PSD predefined by the data 55, instead of the PSD of the actual noise present in the signal, to determine a new SNR, referred to herein as SNR', for the probe signal. SNR' is then compared to the SNR threshold. If SNR' exceeds the threshold, then the probe signal's data rate is determined to be spectrally friendly and, therefore, suitable for use in the training phase 23 and the data phase 16 provided that the signal's actual SNR also exceeds the SNR threshold. If SNR' does not exceed the SNR threshold, then the probe signal's data rate is determined to be spectrally unfriendly and, therefore, unsuitable for use in the training phase 23 and the data phase 16.

The above example is generally based on the assumption that it is possible to simulate noise for a received signal, based on established spectral compatibility standards, such that a predefined signal quality criteria is satisfied, after injection of the simulated noise into the received signal, only if the received signal is spectrally compatible, in the case of a data signal, or spectrally friendly, in the case of an initialization probe signal. Indeed, SNR' is effectively the signal-to-noise ratio of a received signal assuming that the associated noise PSD defined by the data 55 is injected into the signal's noise-free PSD. Thus, SNR' represents the signal-to-noise ratio of the received signal assuming that the noise of the telecommunication line 15 matches the associated noise PSD defined by the data 55.

Moreover, to define a noise PSD for a particular data rate, a user can determine the maximum allowable reach specified by the applicable spectrum management standard. Then, the user can determine a noise PSD that, when injected into a signal transmitted and, therefore, attenuated over a reach significantly higher than the maximum allowable reach, degrades signal quality such that the signal's SNR falls below the SNR threshold. Data defining such a PSD may then be stored in the noise PSD data 55 and associated with the particular data rate such that the control logic 25 uses this PSD to calculate, during training, SNR' for a probe signal having the same particular data rate. As a result, the particular data rate will be selected for the subsequent training and data phases 23 and 16 only if it is spectrally friendly thereby ensuring that the signals communicated during the data phase 16 are spectrally compatible. Further, by selecting a spectrally friendly data rate for the training phase 23, crosstalk interference induced by the training signals is reduced relative to an embodiment that selects a spectrally unfriendly data rate.

Using the aforedescribed techniques for SHDSL, exemplary noise PSDs that can be used to ensure spectral compatibility have been calculated and are listed below in Table 1.

TABLE 1

| Max Reach (ft of AWG 26) | Payload Rate (kbps) | Noise | Reach @ 5 dB (ft of AWG 26) |
|---|---|---|---|
| 15500 | 592 | 2-self | 15282 |
| 15000 | 616 | 2-self | 15032 |
| 14500 | 648 | 3-self | 14336 |
| 14000 | 688 | 3-self | 13983 |
| 13500 | 800 | 2-self | 13501 |
| 12500 | 832 | 5-self | 12468 |
| 12000 | 896 | 5-self | 12086 |
| 13000 | 952 | 1-self | 13173 |
| 12500 | 1000 | 2-self | 12323 |
| 12000 | 1088 | 2-self | 11899 |
| 11500 | 1160 | 2-self | 11585 |
| 11000 | 1320 | 2-self | 10965 |
| 10500 | 1472 | 2-self | 10453 |
| 10000 | 1536 | 3-self | 9943 |
| 10500 | 1552 | 2-self | 10209 |

The above values assume a telecommunication line of 26 American Wire Gauge (AWG), 5 decibels (dB) of margin, and 2 dB of implementation loss. The above values also assume that the SNR threshold is 27.7 dB+margin (i.e., 32.7 dB in the instant example) in accordance with applicable standards in North America. In Table 1, "Max Reach" refers to the maximum reach allowed by T1.417, and "Reach" refers to the maximum reach of the telecommunication line 15 over which a data signal can be communicated at the associated data rate and still be determined to be spectrally compatible according to the techniques described herein. For example, at a data rate of 592 kilobits per second (kbps), T1.417 specifies a maximum reach of 15500 feet (ft). In Table 1, this rate is associated with 2-self noise.

Thus, according to Table 1, the noise PSD defined by the data 55 and associated with the data rate of 592 kbps can be 2-self noise. In such a case, when a probe signal having a data rate of 592 kbps is received by transceiver 14, the control logic 25 can be configured to retrieve the associated noise PSD (i.e., 2-self noise in the instant example) to calculate SNR'. By doing so, the control logic 25 will determine that the probe signal's data rate is spectrally friendly only if the actual reach of the telecommunication line 15 is substantially close to or below approximately 15282 ft provided that the assumptions for Table 1, such as margin and implementation loss, are valid. Thus, noting that this reach is below the maximum allowed by T1.417 (i.e., 15500 ft), the control logic 25 makes an accurate determination about whether the probe signal is spectral friendly even if the actual reach of the telecommunication line 15 is unknown.

It should be noted that techniques for determining the "self" noises specified in Table 1 are generally well known. As an example, the "self" noises specified in Table 1 can be determined from the below formulas, which are in accordance with the G.SHDSL standard (ITU-T G.991.2), assuming that the transceivers 12 and 14 are SHDSL. In this regard, an N-self noise PSD, referred to as $PSD_{NEXT}$, for a transceiver of data rate (R) can be expressed as a function of frequency (f) according to the following equations:

$$PSD_{NEXT}(f) = PSD_{SHDSL-R}(f) \times |H_{NEXT-1Piece}(f,N)|^2$$

and $$|H_{NEXT-1-Piece}(f,N)|^2 = 0.8536 \times 10^{-14} \times f^{1.5} \times N^{0.6}$$

where R is data rate and N indicates the number of "self" interferers. For example, N is 1 for 1-self noise, 2 for 2-self noise, 3 for 3-self noise, etc. $PSD_{SHDSL-R}(f)$ is the nominal PSD associated with R. Such nominal PSD can be expressed according to the following formula:

$$NominalPSD(f) = \left\{ 10^{\frac{-PBO}{10}} \times \frac{K_{SHDSL}}{135} \times \frac{1}{f_{sym}} \times \left[ \frac{\sin\left(\frac{\pi f}{f_{sym}}\right)}{\left(\frac{\pi f}{f_{sym}}\right)^2} \right] \times \frac{1}{1 + \left(\frac{f}{f_{3dB}}\right)^{2 \times Order}} \times \frac{f^2}{f^2 + f_c^2}, f < f_{int} \, 0.5683 \times 10^{-4} \times f^{-1.5}, f_{int} \le f \le 1.1 \text{ MHz} \right\}$$

where $f_c$ is the transformer cut-off frequency, assumed to be 5 kHz, and PBO is the applicable power backoff value in dB, assumed to be zero. The values of $K_{SHDSL}$, Order, $f_{sym}$, $f_{3dB}$ are defined below in Table 2.

TABLE 2

| Payload Data Rate, R (kbit/s) | $K_{SHDSL}$ | Order | $f_{sym}$ (ksymbol/s) | $f_{3dB}$ |
|---|---|---|---|---|
| R < 1 536 | 7.86 | 6 | (R + 8)/3 | $1.0 \times f_{sym}/2$ |
| 1 536 or 1 544 | 8.32 | 6 | (R + 8)/3 | $0.9 \times f_{sym}/2$ |
| R > 1 544 | 7.86 | 6 | (R + 8)/3 | $1.0 \times f_{sym}/2$ |

An exemplary methodology of selecting a suitable data rate will be described in more detail hereinbelow with particular reference to FIG. 4.

Assume that transceivers 12 and 14 are configured to communicate according to SHDSL and that telecommunication line 15 comprises a pair of 26 AWG wires. Also, assume 5 dB of margin and 2 dB of implementation loss for each transceiver. Further, assume that the PSDs of the noise PSD data 55 are defined according to Table 1 above and that the length of telecommunication line 15 is 13000 ft. Further assume that during the pre-activation phase 20, the transceivers 12 and 14 negotiate to communicate three probe signals respectively having data rates of 1552 kbps, 952 kbps and 592 kbps and that the actual SNR of all three probe signals exceeds the SNR threshold. Note that, out of these three data rates, 952 kbps is generally the most suitable. In this regard, as can be seen by referring to Table 1, 952 kbps is the highest data rate of the three without violating T1.417 for the line length of 13000 ft. However, assume that the length of telecommunication line 15 is unknown to the control logic 25.

During the line probing phase 21, the transceiver 12 transmits, over telecommunication line 15, a probe signal having a data rate of 1552 kbps. The transceiver 14 receives this probe signal in block 105 of FIG. 4. Using techniques known in the art, the control logic 25 measures the PSD of the probe signal in block 109 and the noise PSD of the probe signal in block 111. The noise PSD is indicative of the actual noise induced by the telecommunication line 15.

In block 114, the control logic 25 determines the actual SNR of the probe signal based on the probe signal PSD and the noise PSD measured in blocks 109 and 111, respectively. In the instant example, the control logic 25 determines the SNR by dividing the measurement of the probe signal PSD by the measurement of the noise PSD. The control logic 25 compares the calculated SNR to a specified SNR threshold in block 118. In one embodiment, the specified threshold is 32.7 dB in accordance with applicable North American standards assuming 5 dB of margin. Other SNR thresholds may be used in other embodiments. If the SNR' is not greater than the SNR threshold, then the probe signal's data rate is unsuitable for use in the training phase 23 and the data phase 16 and is not selected by the control logic 25. In such a case, the transceiver 14 returns to block 105.

However, in the instant example, it is assumed that the SNR exceeds the SNR threshold. Thus, the control logic 25 makes a "yes" determination in block 118 and proceeds to block 122, in which the logic 25 retrieves from data 55 the predefined noise PSD associated with the data rate of 1552 kbps. As indicated by Table 1, the associated PSD is 2-self noise. In block 125, the control logic 25 determines SNR' based on the PSD measured in block 109 and the noise PSD retrieved in block 122. SNR' can be determined by dividing the measured PSD by the retrieved PSD.

In block 128, the control logic 25 compares SNR' to the SNR threshold. If SNR' is less than the SNR threshold, then the probe signal's data rate is unsuitable for use in the training phase 23 and the data phase 16 and is not selected by the control logic 25. In this regard, a data signal having a similar PSD as the probe signal and transmitted at the same data rate across telecommunication line 15 during the data phase 16 is likely to be spectrally incompatible. In the instant example, the attenuation induced by the telecommunication line 15 should cause SNR' of the 1552 kbps signal to be less than the SNR threshold. Thus, the transceiver 14 returns to block 105.

Upon returning to block 105, the transceiver 14 receives, from the transceiver 12, the probe signal having a data rate of 952 kbps. Using techniques known in the art, the control logic 25 measures the PSD of this probe signal in block 109 and the noise PSD of the probe signal in block 111.

In block 114, the control logic 25 determines the actual SNR of the probe signal based on the probe signal PSD and the noise PSD measured in blocks 109 and 111, respectively. The control logic 25 compares the SNR to the specified SNR threshold in block 118. In the instant example, it is assumed that the SNR exceeds the SNR threshold. Thus, the control logic 25 makes a "yes" determination in block 118 and proceeds to block 122, in which the logic 25 retrieves from data 55 the predefined noise PSD associated with the data rate of 952 kbps. As indicated by Table 1, the associated PSD is 1-self noise. In block 125, the control logic 25 determines SNR' based on the PSD measured in block 109 and the noise PSD retrieved in block 122. SNR' can be determined by dividing the measured PSD by the retrieved PSD.

In block 128, the control logic 25 compares SNR' to the SNR threshold. In the instant case, the attenuation induced by the telecommunication line 15 should not cause SNR' of the 952 kbps signal to be less than the SNR threshold. Thus, the control logic 25 determines that the data rate at issue (i.e., 952 kbps) is suitable for use in the training phase 23 and the data phase 16 and selects this data rate in block 133. Note that a probe signal of 592 kbps may also be tested, but the results of such testing preferably do not change the selection of 952 kbps as the most suitable data rate for the training and data phases 23 and 16 since the selected data rate (i.e., 952 kbps) is greater than 592 kbps.

Figure 4:
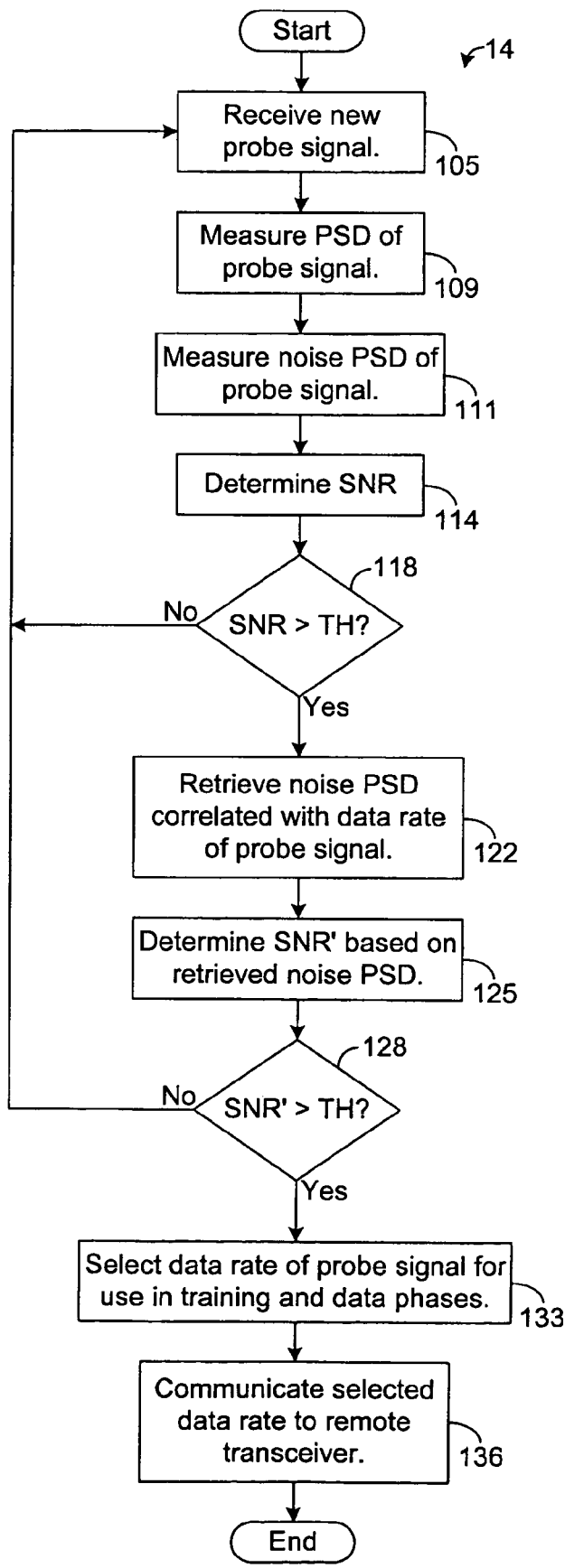
FIG. 4 is a flow chart illustrating an exemplary methodology for selecting a data rate for at least one training and/or data signal communicated by the transceivers of FIG. 1.

After line probing, the transceivers 12 and 14 enter into the second pre-activation phase 22, in which the control logic 25 via block 136 of FIG. 4 transmits a message to the transceiver 12 indicating that the data rate of 952 kbps has been selected for use in the subsequent data phase. The transceivers 12 and 14 then begin to communicate in the training and data phases 23 and 16 at the data rate selected by the control logic 25 in block 133. By selecting this data rate for use in the training and data phases 23 and 16 only after a "yes" determination in block 128, the control logic 25 ensures that the signals communicated during the data phase 16 at the selected data rate are spectrally compatible. Further, crosstalk interference is reduced in the training phase 23 via the selection of a spectrally friendly data rate for the training signals as compared to an embodiment in which a spectrally unfriendly data rate is selected.

It should be noted that aforedescribed methodology does not necessarily select the optimum data rate and may needlessly generate at least some crosstalk interference during the line probing phase 21. For example, in implementing the aforementioned methodology to select a suitable data rate, it is possible for a higher suitable data rate to exist but not be selected because a probe signal having the higher suitable data rate is not tested during the line probing phase 21. As an example, assume that the transceivers 12 and 14 communicate, during line probing, three probe signals respectively having data rates of 1552 kbps, 952 kbps, and 592 kbps, as described above. Further, assume that the reach of telecommunication line 15 is 10400 ft such that a data rate of 1472 kbps is suitable as indicated by Table 1 hereinabove. Using the aforementioned methodology and testing probe signals of 1552 kbps, 952 kbps, and 592 kbps, the control logic 25 will select 952 kbps for the training and data phases 23 and 16 even though 1472 kbps is more suitable since it is both higher than the selected data rate and spectrally friendly. Although it is possible to test more probe signals to arrive at a more optimum data rate, the testing of more probe signals undesirably lengthens the duration of line probing.

It is possible for the control logic 25 to perform interpolation to possibly arrive at a more desirable data rate. For example, if the control logic 25 determines that 1552 kbps is unsuitable but that 952 kbps is suitable, as described above, then the control logic 25 can be configured to select a data rate between 1552 kbps and 952 kbps. In this regard, the control logic 25 can estimate the SNR for a particular rate, such as 1472 kbps, for example, by interpolating between the determined SNRs of 1552 kbps and 952 kbps. However, without actually testing the estimated data rate, there is no guarantee that the estimated data rate, if selected, will be spectrally friendly. Further, if other data rates are actually tested, selection of an even more optimum data rate is possible.

The various spectrum management standards do not typically apply to the initialization phase 18. However, the transmission of probe signals at data rates determined to be spectrally unfriendly can needlessly introduce relatively high levels of crosstalk interference during the line probing phase 21. In this regard, in the above examples, a probe signal of 1552 kbps is transmitted during line probing even though 1552 kbps is unsuitable and, therefore, not selected. If it could be determined that a particular data rate (e.g., 1552 kbps) is unsuitable prior to testing this data rate via the transmission a probe signal, then the transmission of a probe signal at such a high data rate could be avoided. For example, if the 1552 kbps is determined to be unsuitable in the above examples before transmission of the first probe signal, then the transmission of the 1552 kbps probe signal could be skipped thereby eliminating the potential crosstalk interference induced by this probe signal.

In one embodiment of the present disclosure, at least one of the transceivers 12 and 14 is configured to estimate the length of the telecommunication line 15 before probe signals for selecting a desirable data rate are transmitted. Based on this estimate, probe signals are selected for testing in an effort to enable selection of a more optimal data rate and to reduce crosstalk interference. In this regard, the estimated length of the telecommunication line 15 enables the transceivers 12 and 14 to estimate which of the data rates are likely to be suitable. Probe signals having data rates significantly higher than the likely range of suitable data rates are not tested in order to prevent unnecessary crosstalk interference. Further, probe signals having data rates closer to the optimum data rate can be selected for testing. In other words, the selection of data rates to be tested during line probing can be optimized to focus on a relatively narrow range surrounding or close to the highest suitable data rate indicated by the estimated reach. Thus, the range of possible probe signal data rates can be narrowed based on the estimated reach so that the selection of more optimal data rates for testing is likely and so that interference from probe signals having significantly higher data rates is reduced or eliminated.

To estimate the length of the telecommunication line 15, at least one of the transceivers 12 and 14 may be configured to measure an amount of signal attenuation caused by the telecommunication line 15. A greater amount of attenuation generally indicates a longer line length. Moreover, techniques for automatically estimating line length based on signal attenuation are known in the art and may be employed by at least one of the transceivers 12 or 14 to estimate the length of telecommunication line 15.

In one embodiment, the signal used to estimate the reach of telecommunication line 15 is a handshake signal, such as a type of handshake signal normally communicated by conventional transceivers during the pre-activation phase 20. For example, in SHDSL, initialization begins with a G.hs (G.994.1) half-duplex transaction in which capabilities and modes are exchanged via handshake signals between transceivers. The handshake signal transmitted from a customer premises transceiver in such a transaction is a 12 kilo-Hertz (kHz) carrier, and the handshake signal transmitted from a central office transceiver in such a transaction is a 20 kHz carrier. Such handshake signals are sometimes referred to as "G.handshake signals."

It is possible for one of the transceivers 12 or 14 to include, in the handshake signal transmitted to the other transceiver 12 or 14, information indicative of the transmission power level of such handshake signal. Thus, the receiving transceiver 12 or 14 can measure the power level of the handshake signal and compare this power level to the transmitted power level, as indicated by the information in the handshake signal, to estimate the attenuation experienced by the handshake signal in being transmitted over line 15. The approximate length of the line 15 can then be estimated based on the estimated attenuation. Note that, in other embodiments, it is possible for the line length to be estimated based on the attenuation of other types of signals. Also, if the power of the G.hs signal is known a priori, it is unnecessary to rely on the information in the handshake signal.

For the purposes of illustration, it will be assumed hereafter that the control logic 25 estimates the attenuation of a handshake signal received by the transceiver 14 and estimates the reach of telecommunication line 15. However, in other embodiments, it is possible for the other transceiver 12 to estimate attenuation and/or line length.

As shown by FIG. 3, the transceiver 14 preferably stores data rate information 152 indicative of the maximum suitable data rates for various reaches. For example, the data rate information 152 may comprise the information indicated by Table 1 set forth hereinabove. Based on the information 152 and the estimated reach, the control logic 25 selects suitable data rates for the probe signals that are to be communicated to the transceiver 14 during the line probing phase 21. In this regard, the control logic 25 may select data rates close to the maximum suitable data rate indicated for the estimated reach. As an example, the control logic 25 may select the data rate closest to the maximum suitable data rate as well as the next highest and next lowest data rates indicated by the information 152. Alternatively, the control logic 25 may select the data rate closest to the maximum suitable data rate as well as higher and/or lower data rates within a specified range of the maximum suitable data rate. Various algorithms for selecting the probe signal data rates based on the information 152 and the estimated reach are possible.

After selecting the data rates for the probe signals, the control logic 25 preferably transmits information indicative of the data rate selections to the transceiver 12. In response, the transceiver 12 transmits probe signals having the selected data rates to the transceiver 14. Using methodologies described above, such as the methodology indicated by FIG. 4, the control logic 25 can then select one of the data rates of the transmitted probe signal for use in the subsequent training and data phases 23 and 16. However, since the probe signal data rates are initially selected based on the estimated reach of telecommunication line 15, as described above, it is likely that a more optimal data rate for the training phase 23 and the data phase 16 can be ultimately chosen, and it is possible for crosstalk interference introduced by the probe signals communicated during training to be limited or reduced.

Note that it is unnecessary for the reach of line 15 to be estimated automatically as is described above. For example, it is possible for a telecommunication service provider installing or operating either transceiver 12 or 14 to manually estimate the reach of the line 15 and to provide, to either transceiver 12 or 14, an input indicative of the reach or indicative of the maximum suitable data rate for the probe signals. Alternatively, the service provider may submit an input specifying the probe signal data rates to be used during line probing.

Further, it should be noted that it is possible to select the data rate for use in the training phase 23 and the data phase 16 based on the estimated reach without testing probe signals as described above. For example, upon determining the maximum suitable data rate for the probe signals based on the information 152 and the estimated reach, it is possible to simply select this maximum suitable data rate for use in the training phase 23 and the data phase 16 or to select a data rate within a specified range of the maximum suitable data rate without implementing the line probing phase 21. However, accurately estimating reach either automatically or manually can be difficult. Thus, without the testing of the probe signal data rates, as described above, it is much less likely that a selected data rate will be optimal or spectrally compatible. Moreover, selecting various probe signal data rates and then testing probe signals at these selected data rates, as described above with particular reference to FIG. 4, ensures that the signals communicated in the data phase 16 are spectrally friendly even if the estimated reach of the telecommunication line 15 is inaccurate.

It should also be noted that it is possible for portions of the control logic 25 to reside in both transceivers 12 and 14. For example, in the above embodiments, the control logic 25 has generally been described as residing at transceiver 25. However, it is possible for the transceiver 14 to estimate the attenuation introduced by the telecommunication line 15 and to transmit data indicative of this attenuation to the transceiver 12. The transceiver 12 may then select the probe signal data rates and inform the transceiver 14 of the selected probe signal data rates. In such an example, the portion of the control logic 25 for estimating signal attenuation may reside at the transceiver 14, and the portion of the control logic 25 for selecting probe signal data rates may reside at the transceiver 12. In other embodiments, the control logic 25 may be separated among different locations in other ways.

Figure 5:
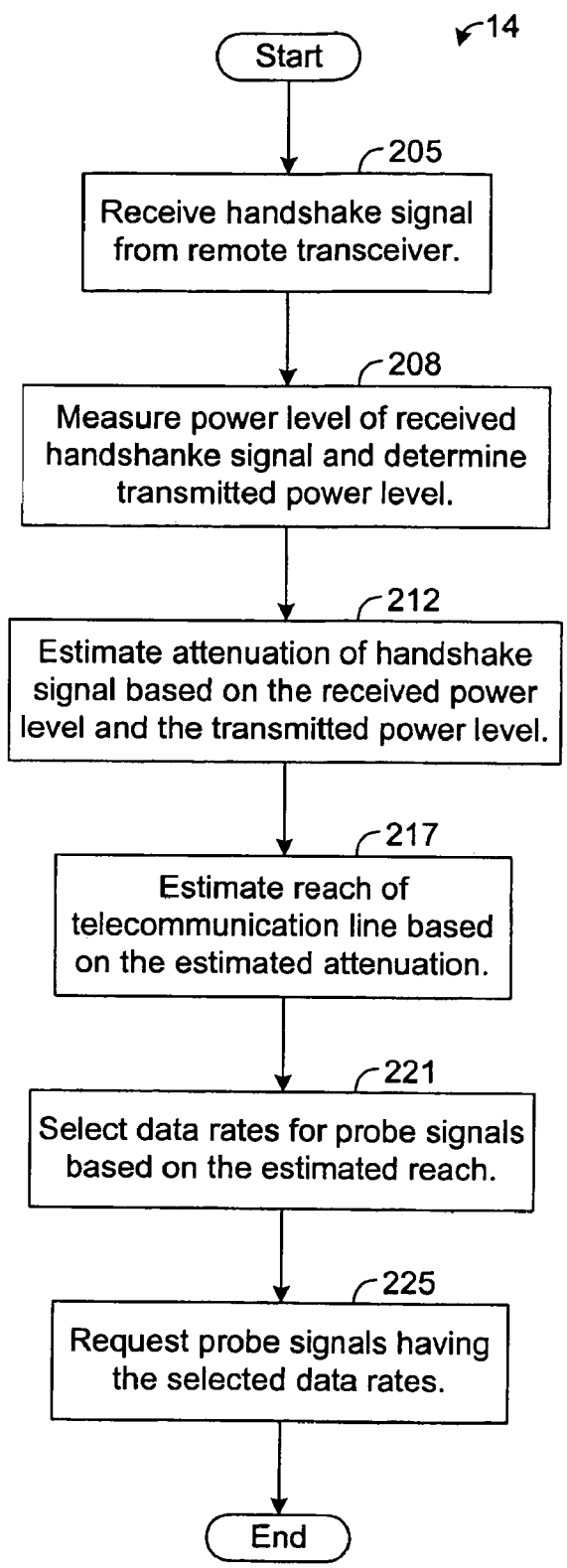
FIG. 5 is a flow chart illustrating an exemplary methodology for selecting a data rate for at least one probe signal communicated by the transceivers of FIG. 1.

An exemplary methodology for selecting probe signal data rates will now be described with particular reference to FIG. 5.

For illustrative purposes, assume that transceivers 12 and 14 are configured to communicate according to SHDSL protocols. Further assume that the actual reach of the telecommunication line 15 is 13900 ft but is unknown by the control logic 25. In addition, assume that the data rate information 152 provides the information indicated by Table 1 set forth above.

At the beginning of initialization (e.g., during the preactivation phase 20), the transceiver 12 transmits a G.handshake signal to the transceiver 14. Included in this handshake signal is data indicative of the transmitted power level of the handshake signal. In block 205 of FIG. 5, the transceiver 14 receives the handshake signal. In block 208, the control logic 25 measures the power level of the received handshake signal and, based on the data included in the handshake signal, determines the transmitted power level of the handshake signal. In block 212, the control logic 25 estimates the attenuation of the handshake signal based on the measured power level of the handshake signal and the transmitted power level of the handshake signal. In block 217, the control logic 25 estimates the reach of the telecommunication line 25 based on the estimated attenuation of the handshake signal.

For illustrative purposes, noting that the actual reach is 13900 ft in the instant example, assume that the control logic 25 estimates the reach as being equal to 14500 ft. In block 221, the control logic 25 selects data rates for probe signals based on the estimated reach. Various algorithms may be employed to select the probe signal data rates based on the estimated reach. For illustrative purposes, assume that the control logic 25 is configured to select the data rate associated, by information 152, with the reach closest to the estimated reach and to select the data rates associated with reaches closest to 1000 ft above and below the estimated reach. Thus, referring to Table 1 set forth above, the control logic 25 selects 648 kbps since its associated reach (i.e., 14336 ft) is closest to the estimated reach of 14500 ft. The control logic 25 also selects 592 kbps since its associated reach (i.e., 15282 ft) is closest to the estimated reach plus 1000 ft (i.e., 14500 ft+1000 ft=15500 ft). The control logic 25 also selects 800 kbps since its associated reach (i.e., 13501 ft) is closest to the estimated reach minus 1000 ft (i.e., 14500 ft−1000 ft=13500 ft).

In block 225, the control logic 25 requests transmission of probe signals having the selected data rates. In this regard, the control logic 25 transmits data indicative of the selected rates to the transceiver 12. In response, the transceiver 12 initially transmits, during the probing phase 21, a probe signal having a data rate of 800 kbps, which is the highest of the selected probe signal data rates. Using the methodology depicted by FIG. 4, the control logic 25 determines whether this probe signal data rate is suitable for use in the subsequent training phase 23 and the data phase 16. Since the reach associated with this data rate (i.e., 13501 ft) is significantly below the actual reach of 13900 ft, SNR' should be less than the SNR threshold assuming that the assumptions for Table 1 are valid, and the control logic 25 should, therefore, determine that 800 kbps is unsuitable for use in the data phase 16.

After transmitting the 800 kbps probe signal, the transceiver 12 next transmits a probe signal having a data rate of 648 kbps, which is the next highest of the data rates selected in block 221. Using the methodology depicted by FIG. 4, the control logic 25 determines whether this probe signal data rate is suitable for use in the training phase 23 and the data phase 16. Since the reach associated with this data rate (i.e., 14336 ft) is well above the actual reach of 13900 ft, SNR' should be greater than the SNR threshold assuming that the assumptions for Table 1 are valid, and the control logic 25 should, therefore, determine that 648 kbps is suitable for use in the training phase 23 and the data phase 16. Thus, the control logic 25 selects 648 kbps as the data rate to be used in the phases 23 and 16.

Note that by strategically selecting the probe signal data rates based on the estimated attenuation and reach, as described above, a more optimal data rate for the data phase 16 is selected and less interference is introduced in the current example, as compared to the previous example described above for which data rates of 1552 kbps, 952 kbps, and 592 kbps are tested. In this regard, if the data rates of 1552 kbps, 952 kbps, and 592 kbps had been tested in the current example where the actual reach is 13900 ft, then 592 kbps would have been selected for use in the training phase 23 and the data phase 16 since this is the only spectrally friendly data rate of the three. However, the data rate of 648 kbps selected for the training phase 23 and the data phase 16 in the current example is generally more optimal since it is higher in addition to being spectrally friendly. Even if the transceivers 12 and 14 are configured to interpolate between various rates, line probe signals closer to the final signal will likely provide more accurate estimates of the line capability. Further, note that the testing of a probe signal at 1552 kbps, the highest probe signal data rate in the previous example, introduces significantly more crosstalk interference than the testing of a probe signal at 832 kbps, the highest selected probe signal data rate in the current example.

Although strategically selecting the probe signal data rates based on estimated attenuation and reach is unnecessary to ensure spectral compatibility of the signals communicated in the data phase 16, doing so can improve the performance of the transceivers 12 and 14 via selection of a more optimal data phase data rate and/or introduction of less crosstalk interference during the initialization phase 18.

Now, therefore, the following is claimed:

1. A transceiver, comprising:
   logic configured to measure attenuation of at least one signal transmitted across a telecommunication line that is coupled to the transceiver, the logic further configured to automatically select, based on the measured attenuation, a plurality of different data rates for a plurality of initialization signals communicated via the transceiver during an initialization phase that precedes a data phase.

2. The transceiver of claim 1, wherein the initialization phase comprises a line probing phase and a subsequent training phase, and wherein each of the initialization signals is communicated via the transceiver during the line probing phase.

3. The transceiver of claim 1, wherein the logic is further configured to automatically determine, based on one of the initialization signals, whether signals to be communicated via the transceiver at the selected data rate for the one initialization signal during the data phase are spectrally compatible.

4. The transceiver of claim 1, wherein the signal transmitted across the telecommunication line comprises data indicative of a transmitted power level of the signal transmitted across the telecommunication line, and wherein the logic is configured to measure the attenuation based on the data.

5. The transceiver of claim 1, wherein the logic is configured to automatically estimate a reach of the telecommunication line based on the measured attenuation.

6. The transceiver of claim 1, wherein the logic is configured to select the data rates for the initialization signals based on a user input, the user input indicative of a maximum data rate for the initialization signals.

7. The transceiver of claim 1, wherein the logic is configured to transmit data indicative of the selected data rates to a remote transceiver.

8. The transceiver of claim 1, wherein the logic is further configured to automatically select a data rate for use in the data phase based the initialization signals.

9. The transceiver of claim 8, wherein the logic is configured to ensure that signals communicated across the telecommunication line during the data phase are spectrally compatible.

10. The transceiver of claim 8, wherein the logic is configured to associate one of the initialization signals with a predefined noise pattern and to ensure that signals communicated across the telecommunication line during the data phase are spectrally compatible based on the predefined noise pattern.

11. The transceiver of claim 10, wherein the logic is configured to determine a signal quality parameter based on the one initialization signal and the predefined noise pattern and to compare the signal quality parameter to a threshold.

12. The transceiver of claim 1, wherein the logic is configured to transmit a data signal across the telecommunication line during the data phase at a data rate selected based on measured signal quality parameters for each of the plurality of initialization signals.

13. The transceiver of claim 1, wherein the logic, based on the measured attenuation, is configured to ensure that each of the plurality of data rates for the plurality of initialization signals during the initialization phase is spectrally friendly.

14. The transceiver of claim 1, wherein the logic, based on the measured attenuation, is configured to determine whether one of the plurality of data rates is spectrally friendly and to select the one data rate for one of the initialization signals based on whether the one data rate is determined by the logic to be spectrally friendly.

15. The transceiver of claim 1, wherein the logic, based on the measured attenuation, is configured to make a determination whether one of the plurality of data rates is spectrally incompatible for the data phase and to select the one data rate for use in the initialization phase based on the determination.

16. The transceiver of claim 1, wherein the logic, based on the measured attenuation, is configured to determine whether each of the plurality of data rates is spectrally compatible for the data phase and to select the plurality of data rates for use in the initialization phase based on whether each of the plurality of data rates is spectrally compatible for the data phase thereby ensuring that each data rate selected for use in the initialization phase is spectrally friendly.

17. A method, comprising the steps of:
estimating an attenuation of a first signal communicated during an initialization phase between a first transceiver and a second transceiver, the initialization phase preceding a data phase between the first and second transceivers;
automatically selecting, based on the estimated attenuation, a data rate for a second signal communicated during the initialization phase;
transmitting the second signal from the first transceiver to the second transceiver during the initialization phase; and
selecting a data rate for use in the data phase based on the second signal.

18. The method of claim 17, wherein the initialization phase comprises a line probing phase and a subsequent training phase, wherein the second signal is transmitted from the first transceiver to the second transceiver during the line probing phase.

19. The method of claim 17, further comprising the step of receiving a user input indicative of a maximum data rate for the second signal, wherein the automatically selecting step is based on the user input.

20. The method of claim 17, wherein the first signal comprises data indicative of a transmitted power level of the first signal, and wherein the estimating step is based on the data.

21. The method of claim 20, wherein the first signal is a handshake signal.

22. The method of claim 17, further comprising the step of determining, based on the signal, whether signals to be communicated during the data phase at the data rate of the second signal are spectrally compatible.

23. The method of claim 22, further comprising the step of associating the second signal with a predefined noise pattern, wherein the determining step is further based on the predefined noise pattern.

24. The method of claim 23, further comprising the steps of:
determining a signal quality parameter based on the second signal and the predefined noise pattern; and
comparing the signal quality parameter to a threshold.

25. The method of claim 17, further comprising the step of:
communicating, during the data phase, a data signal between the first transceiver and the second transceiver at the data rate selected for use in the data phase; and
measuring a signal quality parameter for the second signal, wherein the selecting the data rate for use in the data phase step is based on the measured signal quality parameter.

26. The method of claim 25, wherein the initialization phase has a line probing phase and a training phase that is subsequent to the line probing phase, wherein the transmitting step is performed such that the second signal is transmitted during the line probing phase from the first transceiver to the second transceiver at the data rate selected for the second signal, and wherein the method further comprises the steps of:
communicating, during the training phase, a training signal between the first and second transceivers at the data rate selected for use in the data phase; and
training, based on the training signal, at least one of the transceivers to transmit the data signal at the data rate selected for use in the data phase.

27. A method, comprising the steps of:
communicating a handshake signal between a first transceiver and a second transceiver, the handshake signal comprising data indicative of a power level of the handshake signal;
determining a value indicative of a measured power level of the handshake signal;
comparing the value to the data;
automatically selecting, based on the comparing step, at least one data rate for at least one probe signal to be communicated during an initialization phase between the first and second transceivers; and
causing the at least one probe signal to be transmitted from the first transceiver to the second transceiver during the initialization phase.

28. The method of claim 27, further comprising the steps of:
measuring a signal quality parameter of the at least one probe signal;
automatically selecting, based on the measured signal quality parameter, a data rate for a data signal to be communicated between the first and second transceivers during a data phase that is subsequent to the initialization phase; and
communicating the data signal between the first and second transceivers at the data rate selected for the data signal.

29. The method of claim 28, wherein the initialization phase has a line probing phase and a training phase that is subsequent to the line probing phase, wherein the causing step is performed such that the at least one probe signal is transmitted, during the line probing phase, from the first transceiver to the second transceiver at the at least one data rate for the at least one probe signal, and wherein the method further comprises the steps of:
communicating a training signal, during the training phase, between the first and second transceivers at the data rate selected for the data signal; and
training, based on the training signal, at least one of the transceivers to transmit the data signal at the data rate selected for the data signal.

30. A communication system, comprising:
at least one receiver circuit coupled to a telecommunication line;
at least one transmitter circuit coupled to the telecommunication line, the transmitter circuit configured to transmit a plurality of initialization signals across the telecommunication line to the receiver circuit during an initialization phase that precedes a data phase, the transmitter circuit further configured to transmit a data signal across the telecommunication line to the receiver circuit during the data phase; and
logic configured to measure attenuation of at least one signal transmitted across the telecommunication line from the transmitter circuit to the receiver circuit, the logic configured to automatically select, based on the measured attenuation, a plurality of different data rates for the plurality of initialization signals such that each of the plurality of initialization signals is transmitted across the telecommunication line at a different data rate during the initialization phase, the logic further configured to measure signal quality parameters for the plurality of initialization signals and to select a data rate for the data signal based on the measured signal quality parameters.

31. The system of claim 30, wherein the initialization phase has a line probing phase and a training phase that is subsequent to the line probing phase, the transmitter circuit further configured to transmit the plurality of initialization signals during the line probing phase and to transmit a training signal across the telecommunication line to the receiver circuit during the training phase at the data rate selected for the data signal, wherein the logic is configured to train, based on the training signal, the transmitter circuit to transmit the data signal at the data rate selected for the data signal.

* * * * *